(12) United States Patent
Cybularz et al.

(10) Patent No.: US 6,402,477 B1
(45) Date of Patent: *Jun. 11, 2002

(54) ADJUSTABLE BLADE TURBINES

(75) Inventors: Joseph M. Cybularz, Jacobus; Richard K. Donelson, Emigsville; Richard K. Fisher, Jr., Jacobus; Robert G. Grubb; Randy V. Seifarth, both of York, all of PA (US); Siegbert Etter, Heidenheim (DE); Donald E. Zehner, Etters, PA (US)

(73) Assignee: Voith Siemens Hydro Power Generation, Inc., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/723,590

(22) Filed: Nov. 28, 2000

Related U.S. Application Data

(62) Division of application No. 09/314,225, filed on May 18, 1999, now Pat. No. 6,164,907, which is a division of application No. 08/623,245, filed on Mar. 28, 1996, now Pat. No. 5,947,679.

(51) Int. Cl.⁷ .............................. F03B 3/06; F03B 3/18; F03B 15/10; F03B 15/14

(52) U.S. Cl. .............. 416/244 A; 416/174; 416/245 A; 415/13; 415/17; 415/24; 415/33; 415/36; 415/42; 415/170.1; 415/174.2

(58) Field of Search ............... 415/13, 17, 24, 415/33, 36, 41, 42, 1, 170.1, 173.3, 174.2, 174.3; 416/31, 36, 37, 44, 48, 43, 46, 136, 137, 140, 174, 244 A, 244 B, 245 R, 245 A; 440/50, 71, 73

(56) References Cited

U.S. PATENT DOCUMENTS

| | | | | |
|---|---|---|---|---|
| 1,901,773 A | * | 3/1933 | Pfau ............................. 415/17 |
| 2,090,093 A | * | 8/1937 | Andrews ................. 416/168 A |
| 2,290,666 A | * | 7/1942 | Ashelman et al. .......... 416/136 |
| 2,378,958 A | * | 6/1945 | Troller ........................ 416/147 |
| 2,382,535 A | * | 8/1945 | Bauer .......................... 415/129 |
| 2,421,841 A | * | 6/1947 | Lowy ........................... 403/199 |
| 2,470,517 A | * | 5/1949 | Obrist ......................... 415/912 |
| 2,498,072 A | * | 2/1950 | Dean ...................... 244/134 R |
| 2,776,107 A | * | 1/1957 | Willi ........................... 415/164 |
| 3,081,975 A | * | 3/1963 | Sproule et al. ............. 277/431 |
| 3,601,497 A | * | 8/1971 | Mayo .......................... 415/163 |
| 3,822,104 A | * | 7/1974 | Poet ....................... 416/168 A |
| 4,453,887 A | * | 6/1984 | Schucker .................... 181/213 |
| 4,475,865 A | * | 10/1984 | Sugishita et al. ............. 415/36 |
| 4,640,664 A | * | 2/1987 | Sato et al. ...................... 415/1 |
| 4,683,718 A | * | 8/1987 | Larsson ........................ 415/24 |
| 5,209,640 A | * | 5/1993 | Moriya ......................... 416/27 |
| 5,947,679 A | * | 9/1999 | Cybularz et al. ............. 415/13 |
| 5,954,474 A | * | 9/1999 | Fisher et al. ................ 29/889.2 |
| 6,164,907 A | * | 12/2000 | Cybularz et al. ........... 415/163 |
| 6,254,339 B1 | * | 7/2001 | Fisher et al. ................ 415/163 |

FOREIGN PATENT DOCUMENTS

| | | | | |
|---|---|---|---|---|
| JP | 59-115475 A | * | 7/1984 | ................. 416/174 |

* cited by examiner

Primary Examiner—Christopher Verdier
(74) Attorney, Agent, or Firm—Foley & Lardner

(57) ABSTRACT

A turbine, adaptable to improve the survivability of fish present in water flowing therethrough, includes a hub and associated runner blades. Each blade comprises an inner edge and a distal outer edge, a leading edge and a trailing edge separated by a water directing surface. Each blade is rotatable relative to the hub about a blade rotational axis. The turbine is provided with a gap shielding device designed to shield a gap formed between the hub and the blade inner edge as the blade is rotated about its axis. The gap shielding device may comprise a plurality of independently biased pins, a plurality of fluid jets, a plurality of flexible members, a fluid-filled boot, and combinations thereof.

20 Claims, 15 Drawing Sheets

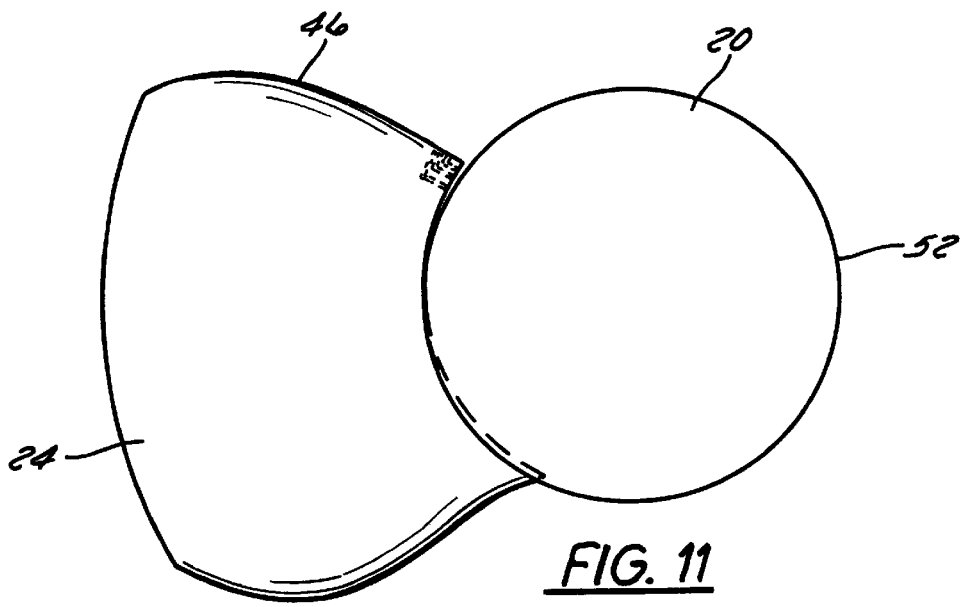
FIG. 11
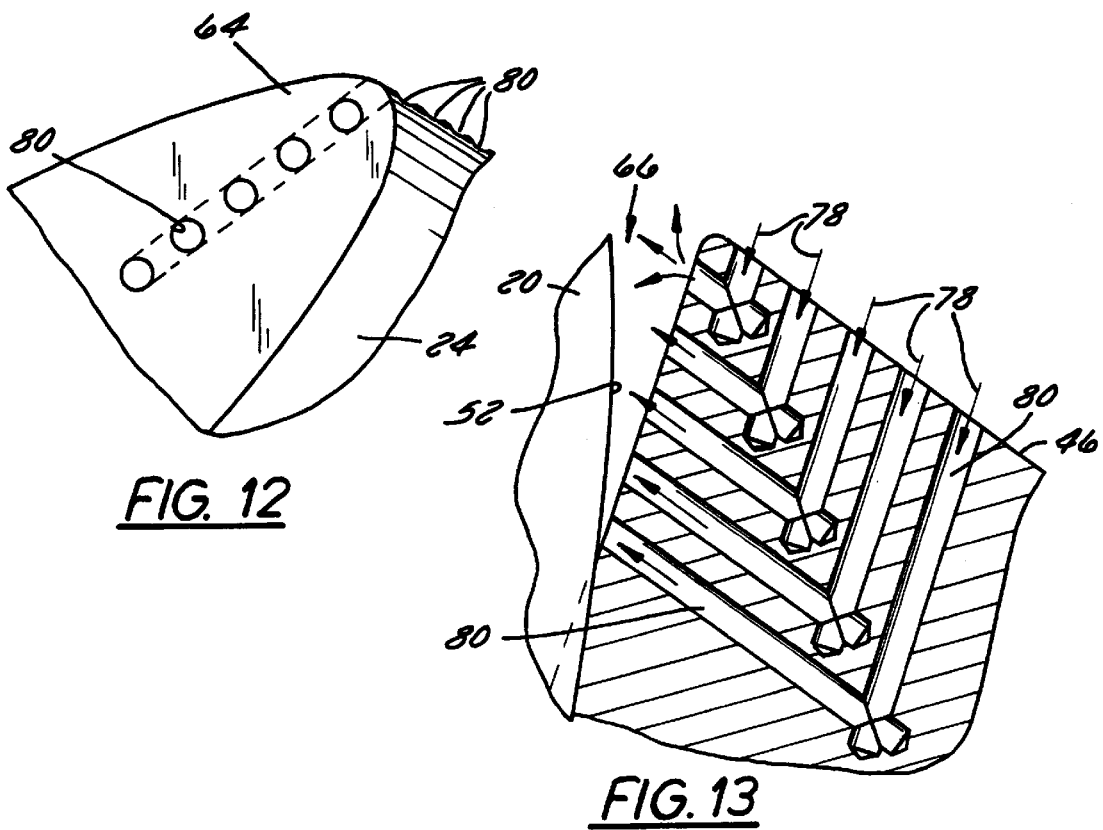
FIG. 12
FIG. 13

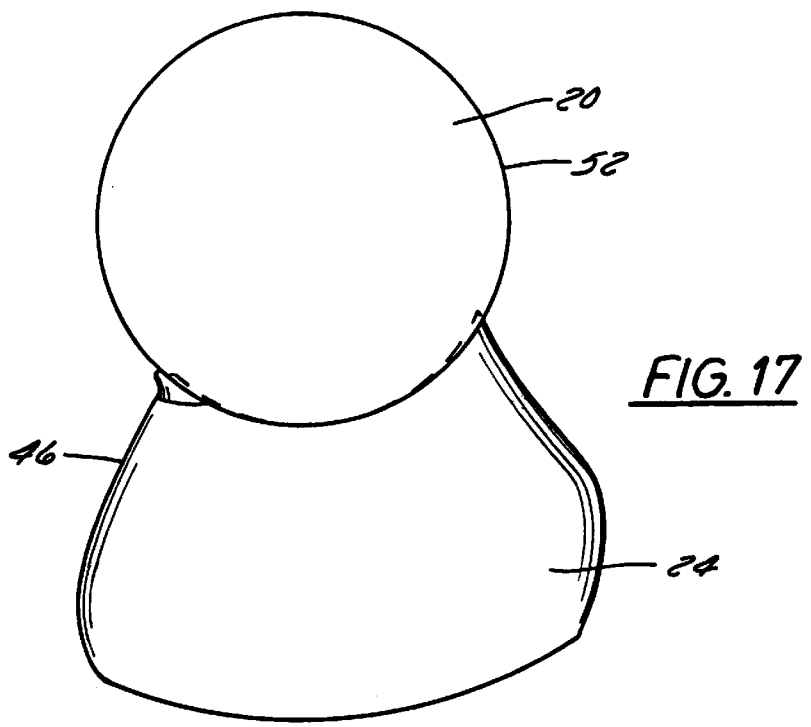
FIG. 17
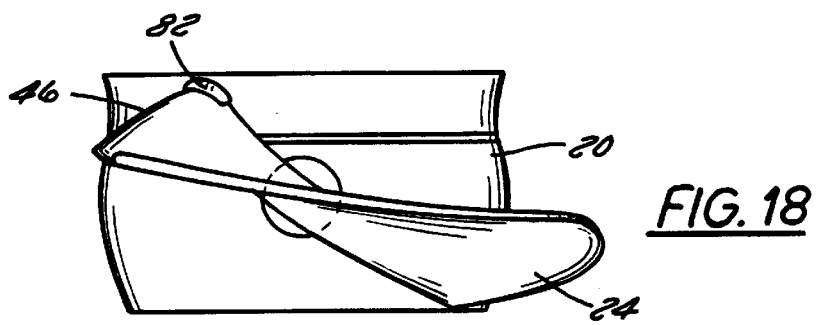
FIG. 18
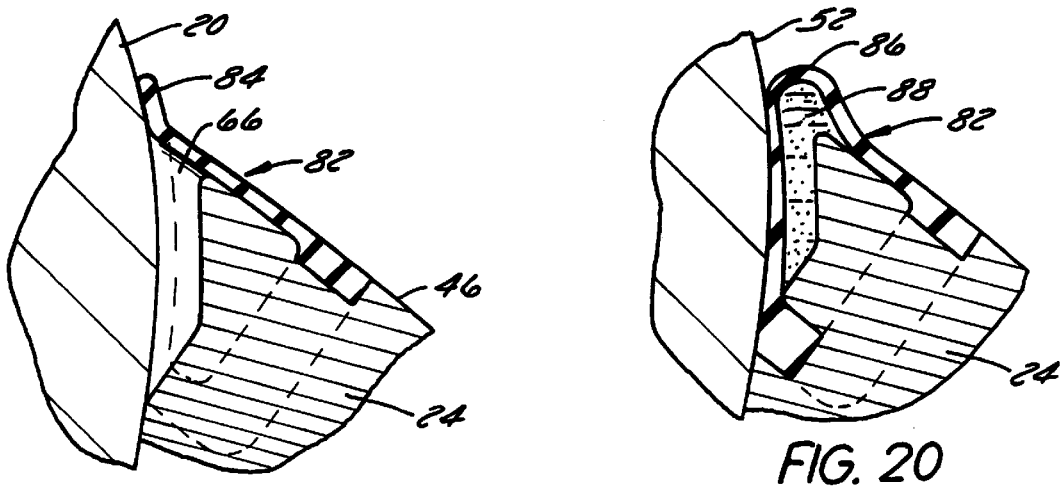
FIG. 19
FIG. 20

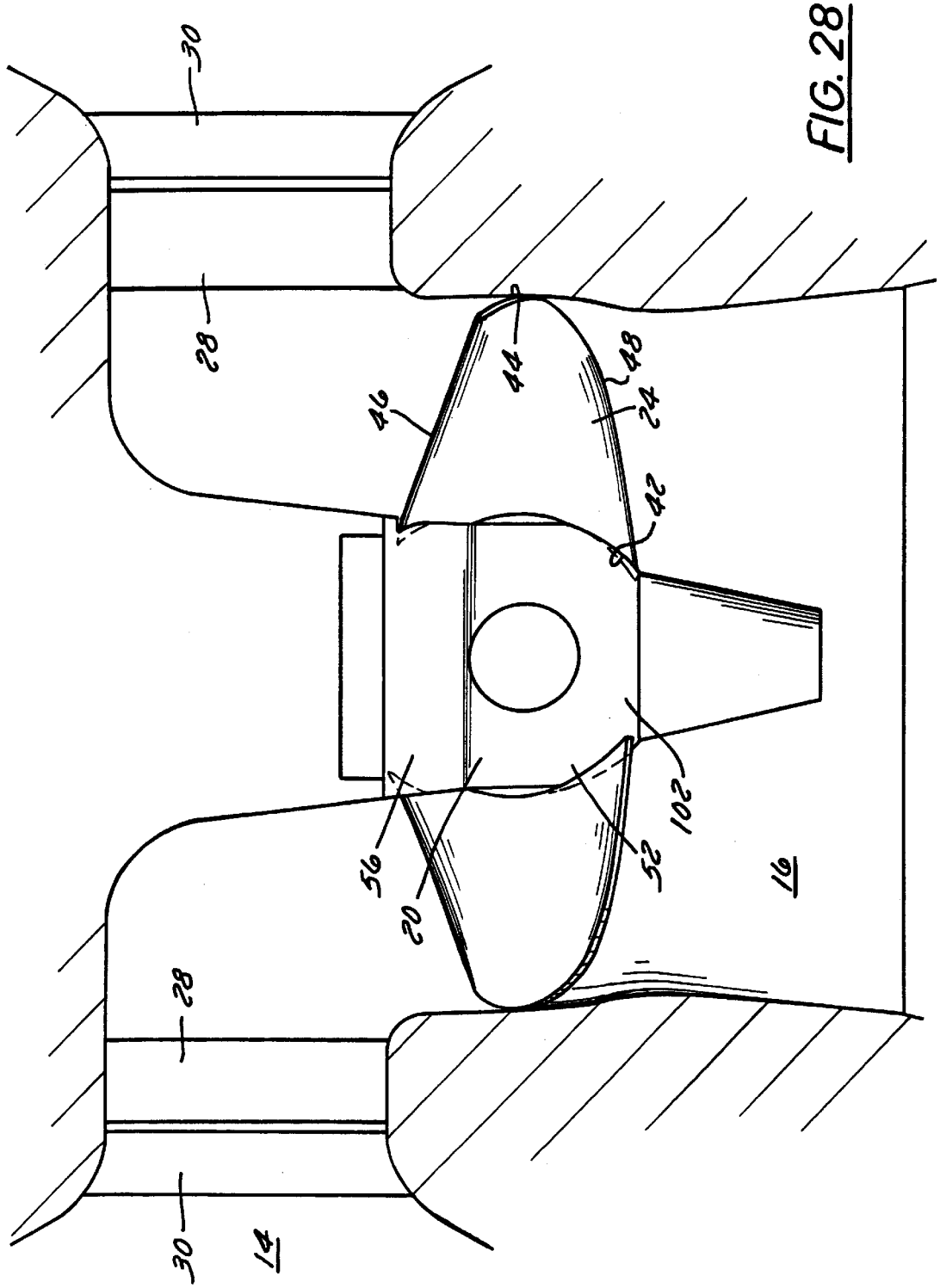

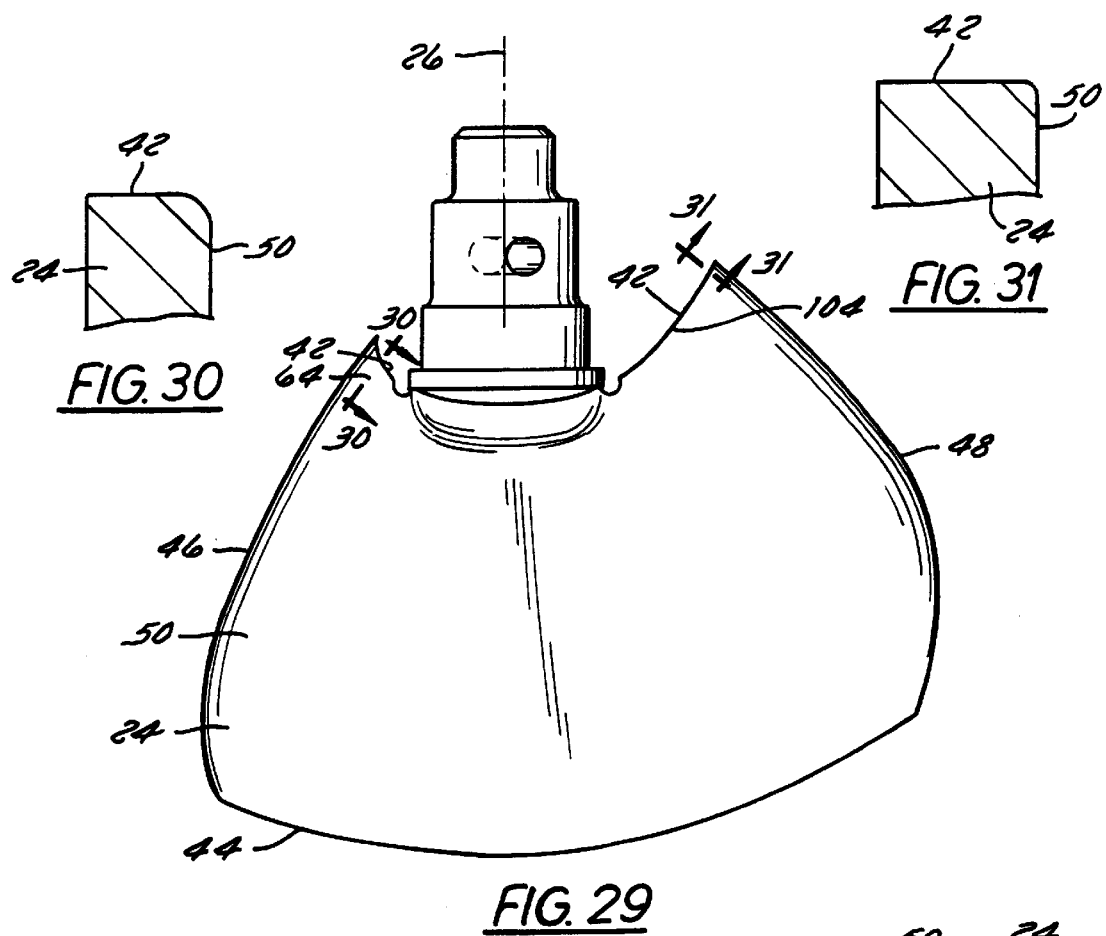
FIG. 30
FIG. 31
FIG. 29
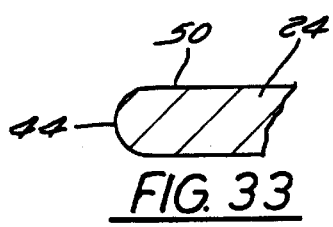
FIG. 33
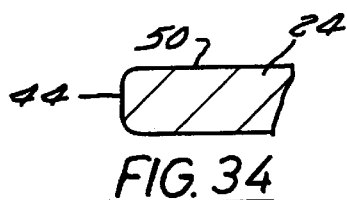
FIG. 34
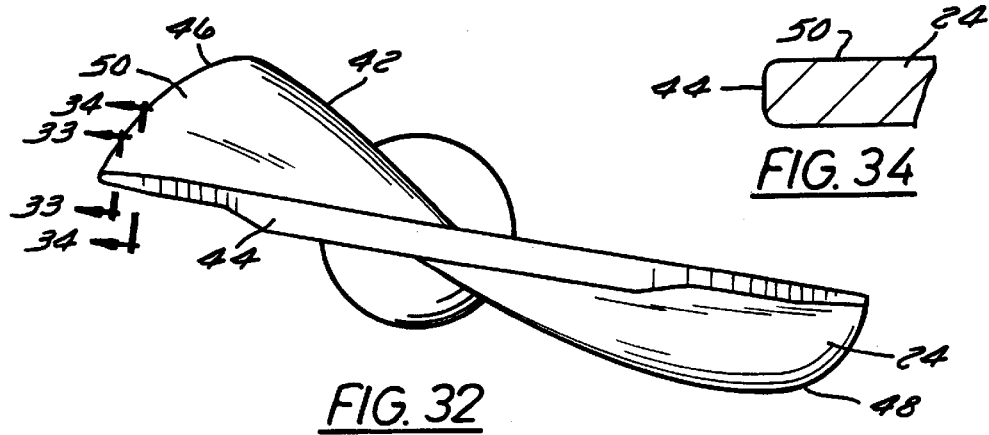
FIG. 32

ADJUSTABLE BLADE TURBINES

RELATED APPLICATIONS

This application is a divisional of U.S. Ser. No. 09/314,225 filed on May 18, 1999, now U.S. Pat. No. 6,164,907, which is a divisional of U.S. Ser. No. 08/623,245 filed on Mar. 28, 1996, now U.S. Pat. No. 5,947,679.

FIELD OF THE INVENTION

The present invention relates generally to hydroelectric turbine installations. More particularly, this invention pertains to hydroelectric installations utilizing propeller-type turbines in which the angular position of the runner blades relative to the hub of the turbine or propeller, i.e. the pitch of the blades, is adjustable.

BACKGROUND OF THE INVENTION

Hydroelectric turbine installations in which the turbine comprises several runner blades having an adjustable pitch are widely used. In these turbines, each runner blade (often simply called a "blade"), is pivotally connected to the hub and rotatable about an axis extending in a direction generally perpendicular to the hub. The rotation of each blade about its axis permits the turbine operator to seek optimum efficiency of the hydroelectric installation under the entire range of operating conditions of the turbine. In the hydroelectric industry, turbines with adjustable pitch blades are commonly referred to as "Kaplan turbines". Kaplan turbines are also typically provided with adjustable wicket gates designed to regulate the flow of water admitted to the turbine.

It is well recognized that hydroelectric power generation is generally socially more desirable than its counterparts which obtain energy from the combustion of fossil fuel or the fission or fusion of atoms. It is also widely accepted that Kaplan turbines materially improve the efficiency of hydroelectric installations. However, it is increasingly being suspected that certain Kaplan installations have various detrimental impacts on the environment, particularly on the fish population which is present in the water flowing through the turbine.

One of these potentially adverse impacts results from the very features of Kaplan turbines that increase the efficiency of hydroelectric installations using these turbines. Specifically, in a Kaplan turbine having its main axis generally vertical, the pitch of the blades is adjustable from maximum blade opening or pitch, i.e., when the face of each blade is almost parallel to the main turbine axis, to minimum blade opening or pitch in which case the face of each blade is placed in a flatter position (i.e., generally perpendicular to the flow of water fed to the turbine). In Kaplan turbines having a non-fully spherical upstream hub, when the blade is at low pitch a gap is created between the hub and the leading edge of the blade (i.e., upstream of the axis of rotation of the blade relative to the hub), as illustrated for example in FIG. 26.

Various studies have shown that these gaps have several detrimental effects. First, a gap between the hub and the blade creates cavitation due to water leakage occurring through the gap. Significantly, the gap (particularly upstream of the blade rotational axis) is also a trap for fish which are present in the water flowing through the turbine. It is believed that fish flowing into the gap have a significantly greater chance of being injured or killed than fish flowing through other regions of the turbine.

Recent efforts have therefore been undertaken to address the apparent propensity of Kaplan turbines to injure fish. For example, systems have been designed to divert fish away from Kaplan turbines. These systems include screens to keep fish out of the turbine, or structures designed to divert fish away from the turbine. It can be readily appreciated, however, that these prior art structures have several shortcomings. First, systems of the type necessitating separate structures restrict the amount of water flowing through the turbine thereby reducing the efficiency of the turbine and causing energy losses. Second, it has been found that these systems are not fully effective to divert the entire fish population away from the turbine. In addition, screens turn into nets in which the fish are caught; the screens must therefore be rotated to discharge the fish caught in the screens in regions of the water not flowing through the turbine. Finally, as can be readily appreciated, these additional structures which, in addition to not being entirely satisfactory, materially increase the cost of hydroelectric installations using Kaplan turbines.

Various attempts have also been made to increase the efficiency of adjustable pitch propellers and turbines by reducing the gap formed in these mechanisms. For example, U.S. Pat. No. 2,498,072 issued Feb. 21, 1950 to Dean discloses an aircraft propeller in which the pitch of the blades is adjustable. To reduce air turbulence and drag in the region of the gap formed at the base of the blade, a seal made of molded rubber is attached to the hub embracing the blade airfoil. Still another example of an approach used to improve the operating characteristics or air propellers is illustrated in U.S. Pat. No. 2,378,958 issued on Jun. 26, 1945 to Troller. In Troller, to minimize noise and air turbulence, the rim of the propeller having a cylindrical outer surface is provided with a recess to receive the base portion of the blade. The close tolerance between the base of the blade and the recess generally improves the operation of the propeller. The inventors of the present invention are also aware of the use in the late 1920's of a technique somewhat similar to that disclosed in Troller to attempt to increase the efficiency of Kaplan turbines.

The foregoing indicates that various attempts have been made to increase the efficiency of air propellers and Kaplan turbines. However, none of these attempts have been utilized to increase the survivability of fish as they pass through these turbines. Moreover, in view of the fact that prior art systems and methods to divert fish away from Kaplan turbine are costly and not fully satisfactory, there is a need to find other ways to lessen the ability of Kaplan turbines to injure fish, thereby enhancing the environmental characteristics of these turbines, while increasing, or at least not impairing the overall efficiency of these installations.

SUMMARY OF THE INVENTION

The present invention improves the survivability of fish present in water flowing through a turbine of the type comprising a hub and a plurality of blades pivotally connected to the hub.

In accordance with one aspect of the invention, a turbine installation having reduced inner and outer gaps comprises a water passageway and a turbine runner disposed in the passageway downstream of a discharge ring. The turbine runner includes a hollow hub having spaced apart inner and outer surfaces and a longitudinal axis and a plurality of runner blades. Each blade comprises a hydrofoil having an inner edge and a distal outer edge, a leading edge and a trailing edge separated by a water directing surface. Each blade is pivotally connected to the hub about a rotational axis extending in a direction generally perpendicular to the longitudinal axis so that its inner edge is proximate the hub. Each blade is rotatable between a maximum pitch position and a minimum pitch position. The discharge ring has a spherical configuration cooperable with the outer edge of each of the blades to reduce an outer gap formed between the outer edge of each of the blades and the passageway. The hub may be configured as a sphere downstream of the blade rotational axes to reduce an inner gap formed between the inner edge of each of the blades and the hub. Alternatively or in addition, the hub may include a plurality of pockets or raised areas locally formed on the outer surface of the hub to reduce the inner gap formed between the inner edge of each of the blades and the hub.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 11 is a top plan view of the hub and one associated blade in accordance with another embodiment of the present invention, showing a plurality of blade water jets;

FIG. 12 is an enlarged perspective view of a portion of the inner edge of the blade shown in FIG. 11;

FIG. 13 is an enlarged partial sectional view of the blade and hub shown in FIG. 11;

FIG. 17 is a top plan view of the hub and one associated blade in accordance with another embodiment of the present invention, showing a boot fitted onto a portion of the inner edge of the blade;

FIG. 18 is a front elevational view of the hub, blade and boot shown in FIG. 17;

FIG. 19 is an enlarged partial sectional view of a first configuration of the boot used with the blade and hub shown in FIG. 17;

FIG. 20 is an enlarged partial sectional view of a second configuration of the boot used with the blade and hub shown in FIG. 17;

FIG. 28 is a front elevational view of the hub and blades in accordance with the present invention showing a downstream spherical hub and rounded blade outer edge;

FIG. 29 is a top plan view of a typical rotatable blade embodying another aspect of the present invention;

FIG. 30 is a partial cross-sectional view of a portion of the inner edge of the blade of FIG. 29 taken along line 30—30 shown in FIG. 29;

FIG. 31 is a partial cross-sectional view of a portion of the inner edge of the blade of FIG. 29 taken along lines 31—31 shown in FIG. 29;

FIG. 32 is a front elevational view of the blade shown in FIG. 29;

FIG. 33 is a partial cross-sectional view of a portion of the leading edge of the blade of FIG. 32 taken along lines 33—33 shown in FIG. 32;

FIG. 34 is a partial cross-sectional view of a portion of the leading edge of the blade of FIG. 32 taken along lines 34—34 shown in FIG. 32.

DETAILED DESCRIPTION OF A PREFERRED EXEMPLARY EMBODIMENT

The present invention relates generally to hydroelectric installations having turbines provided with features designed to improve the survivability of fish present in water flowing through the turbines. The turbines are of the type comprising a hub and a plurality of blades pivotally connected to the hub. It should be understood, however, that the invention is applicable to any other type of turbine or propeller in which the blades are pivotally adjustable with respect to the hub.

Figure 1:
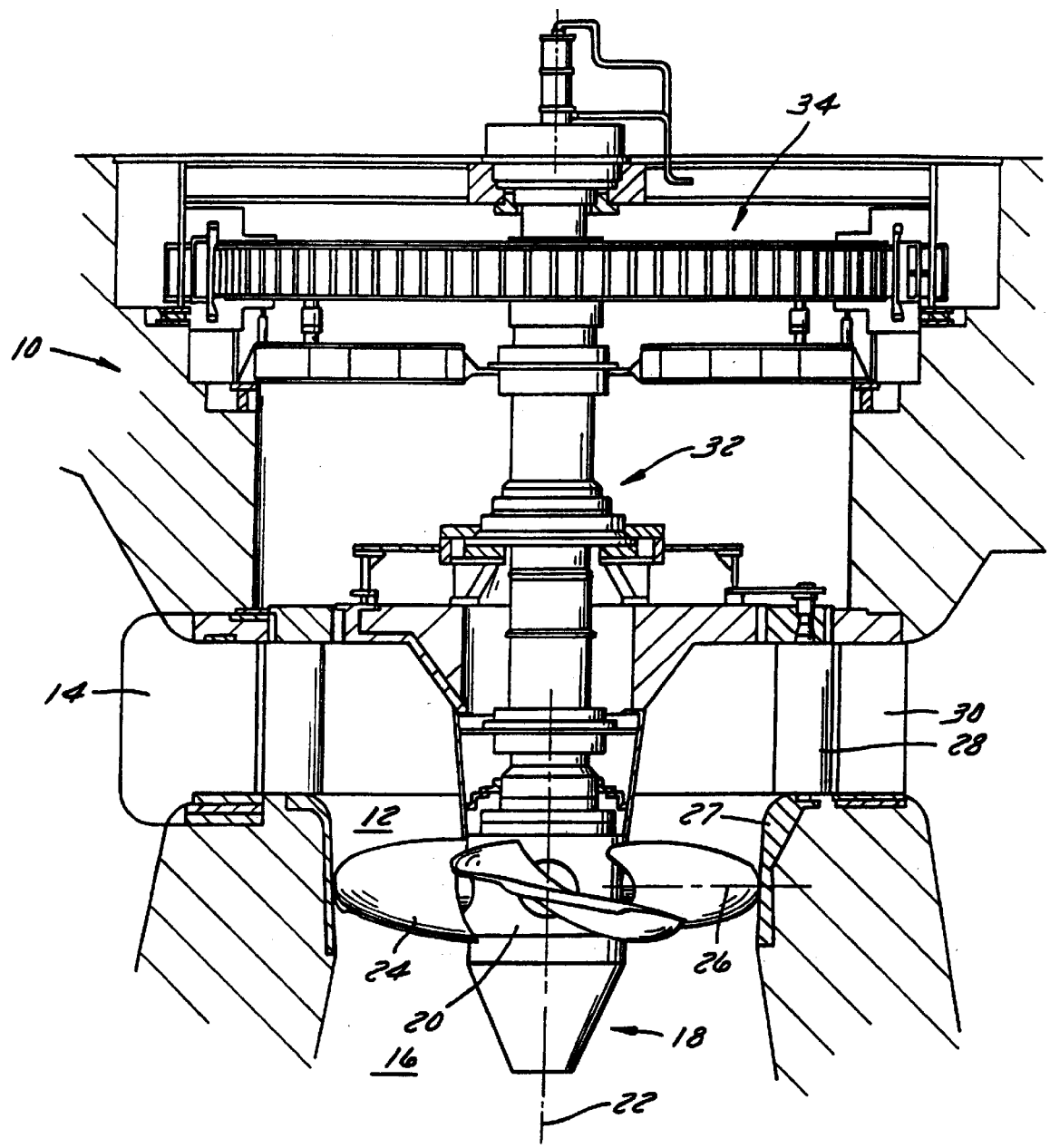
FIG. 1 is an elevational view, partially in cross section, of a hydroelectric installation including a turbine with adjustable blades.

Referring to FIG. 1, a hydroelectric installation generally designated as 10 comprises a passageway 12, in which water flows from an upper elevation source in fluid communication with the upstream end 14 of installation 10, to a lower elevation discharge region 16. Installation 10 also includes a turbine 18 of the type comprising a hub 20 having a longitudinal axis 22, and a plurality of runner blades 24 pivotally connected to hub 20. Each blade 24 is movable about a rotational axis 26 extending in a direction generally perpendicular to longitudinal axis 22. While the present invention will be described with reference to turbine 18 in which longitudinal axis 22 is vertical as shown in FIG. 1, those skilled in the art will appreciate that the present invention is similarly applicable to turbines disposed horizontally or at any position deviating from the horizontal or vertical, depending on the particular configuration of passageway 12. Additionally, axes of rotation 26 could be inclined relative to longitudinal axis 22 without in any way departing from the scope of the present invention.

Intermediate upstream end 14 and rotational axis 26 is disposed a discharge ring 27 which directs the flow of water from upstream end 14 toward turbine 18. Installation 10 includes several wicket gates 28, which may be adjusted in rotation to regulate the flow of water admitted to passageway 12, and stay vanes 30 which are designed to support the portion of installation 10 located above turbine 18, that is, the thrust bearing 32, generator 34, and associated control systems and components typically located in the power station, some of these systems constituting what is commonly known in the industry as the "governor".

Figure 2:
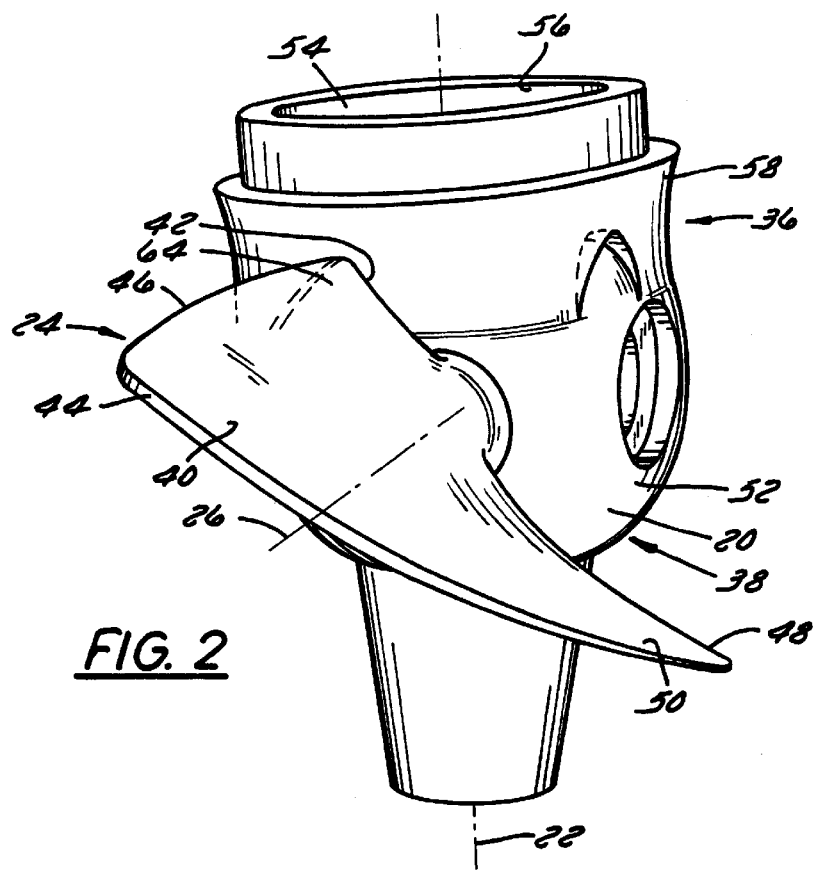
FIG. 2 is a perspective view of a first embodiment of the hub and one associated blade, the blade being shown at maximum pitch position.
Figure 3:
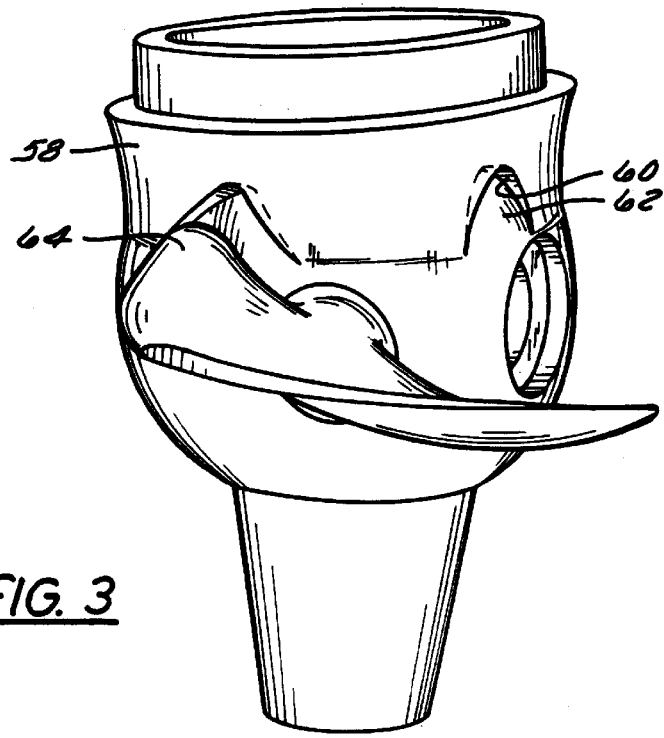
FIG. 3 is a perspective view of the hub and blade of FIG. 2, the blade being shown at minimum pitch position.
Figure 4:
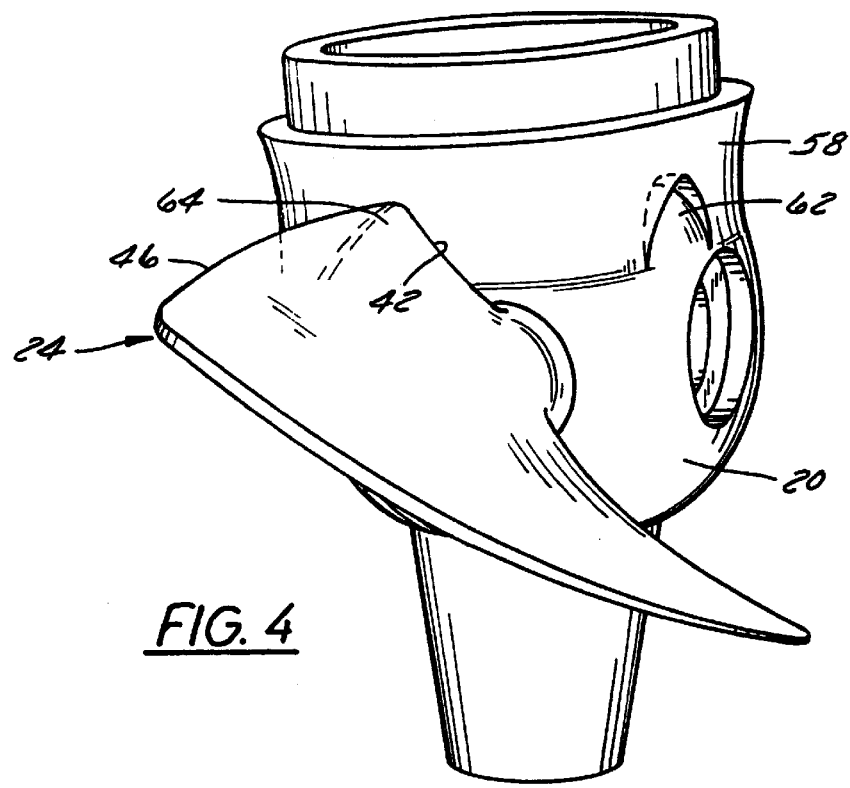
FIG. 4 is a perspective view of a hub and one associated blade according to another aspect of the present invention, the blade being shown at maximum pitch position.
Figure 5:
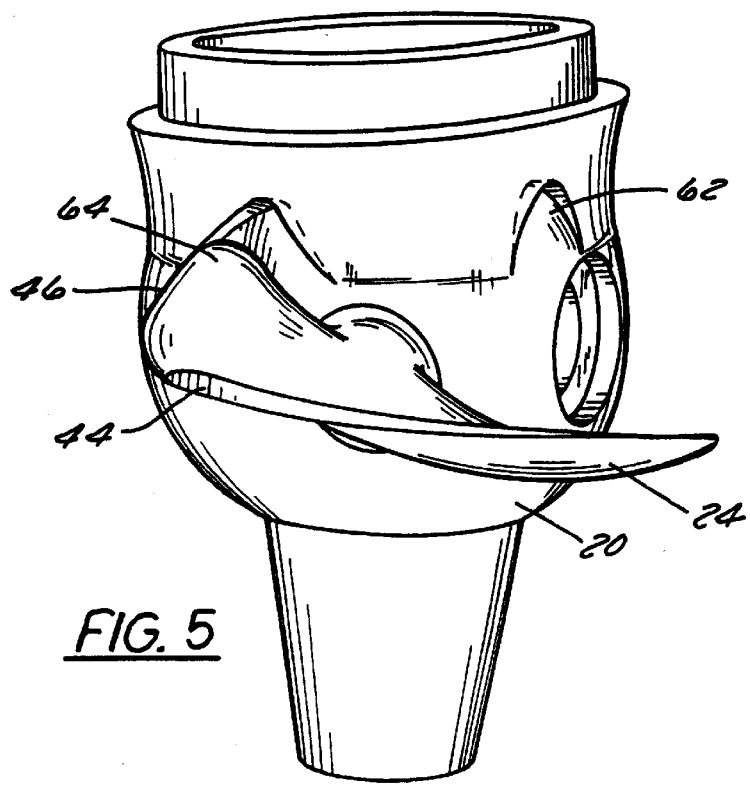
FIG. 5 is a perspective view of the hub and blade of FIG. 4, the blade being shown at minimum pitch position.
Figure 6:
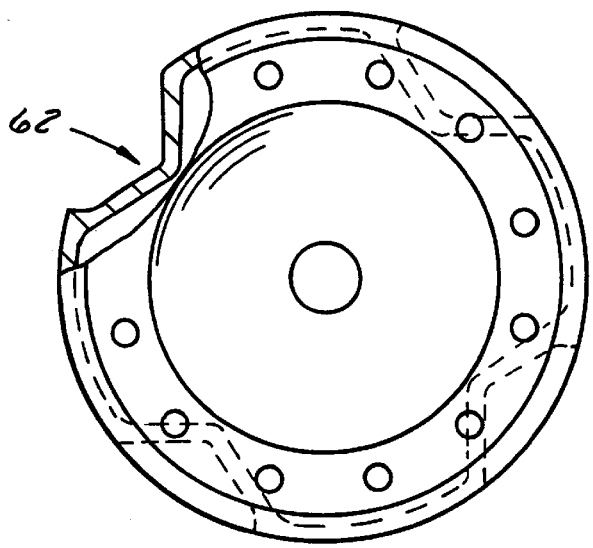
FIG. 6 is a top plan view of the hub shown in FIG. 4, with the region of a blade pocket shown in partial section view.

Referring now more particularly to FIGS. 2 and 3, hub 20 comprises an upstream region 36 and a downstream region 38 located on the upstream and downstream sides of rotational axis 26, respectively. Turbine 18 also typically includes between 2 and 9 runner blades 24. However, in the various Figures only one blade will be represented to facilitate the description of the present invention.

Each blade 24 comprises a hydrofoil generally designated as 40 having an inner edge 42 and a distal outer edge 44, a leading edge 46 and a trailing edge 48 separated from leading edge 46 by a water directing surface 50. Blade 24 is disposed for rotational movement relative to hub 20 with its inner edge 42 proximate to the outer surface 52 of hub 20. Hub 20 is generally hollow, the hollow cavity 54 being defined by an inner surface 56 which is spaced apart and oppositely faces outer surface 52. Cavity 54 conveniently houses the various mechanisms, linkages and other systems necessary for the rotation of blades 24 about axes 26. As illustrated in FIG. 2, when blade 24 is at maximum pitch position, water directing surface 50 points in a direction generally parallel to longitudinal axis 22. At minimum pitch position (as illustrated in FIG. 3), water directing surface 50 is substantially perpendicular to longitudinal axis 22.

In a first embodiment of the present invention, hub 20 includes a fabricated shroud 58 disposed about outer surface 52, in the upstream region 36 of hub 20. Shroud 58 includes a plurality of cavities 60. Because shroud 58 is configured to substantially conform to outer surface 52, cavities 60 form with outer surface 52 pocket regions 62 which are used to receive the portion 64 of leading edge 46 proximate inner edge 42 as blade 24 approach maximum pitch (as illustrated in FIG. 2). Conversely, when blade 24 is at minimum pitch as shown in FIG. 3, portion 64 substantially comes out of pocket 62 without, however, forming a gap with spherically configured outer surface 52. This means that at minimum pitch, as well as at maximum pitch, there are no open regions formed between inner edge 42 and outer surface 52 of hub 20 which are accessible to fish present in water supplied to turbine 18. As a result, fish are not injured by blades 24 as they travel in passageway 12 through turbine 18.

Figure 7:
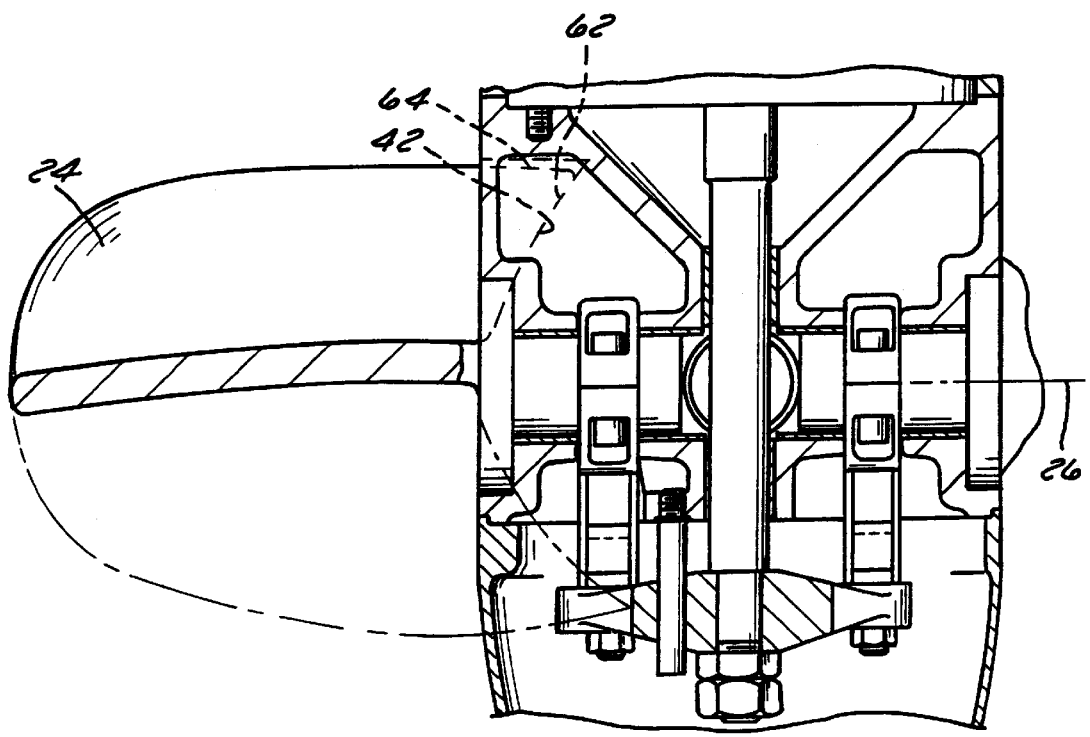
FIG. 7 is a cross-sectional view of the hub and blade shown in FIG. 4.

Alternatively, shroud 58 may also be formed integrally with hub 20, as illustrated in FIGS. 4–7. As shown in FIG. 7, at maximum pitch portion 64 of blade 24 is received in pocket 62, thereby effectively eliminating any gap between outer surface 52 and inner edge 42.

For various reasons, it may not be practical to use shroud 58 in certain hydroelectric installations. In those cases, other embodiments of the present invention may be used to reduce or shield the gap formed between the inner edge of the blade and the hub of the turbine. Examples of such other embodiments will now be discussed referring more particularly to FIGS. 8–16.

Figure 8:
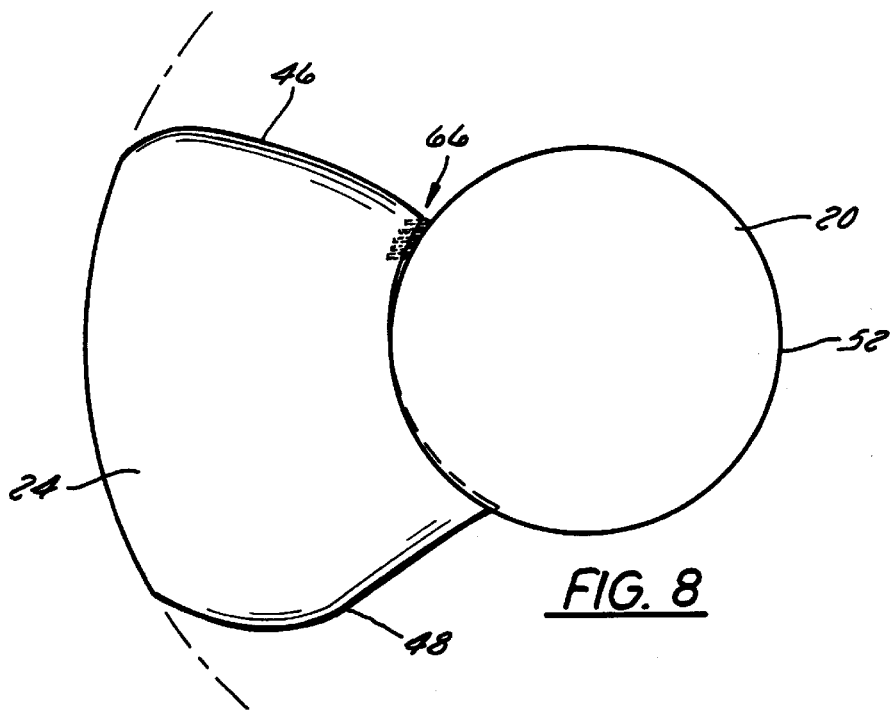
FIG. 8 is a top plan view of the hub and one associated blade in accordance with another embodiment of the present invention, showing a plurality of spring-biased fingers.
Figure 9:
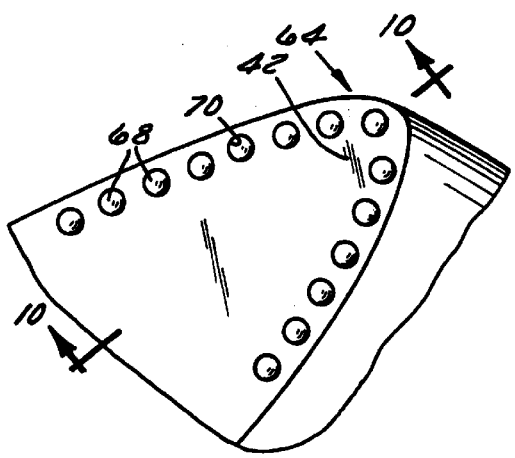
FIG. 9 is an enlarged perspective view of a portion of the inner edge of the blade shown in FIG. 8.
Figure 10:
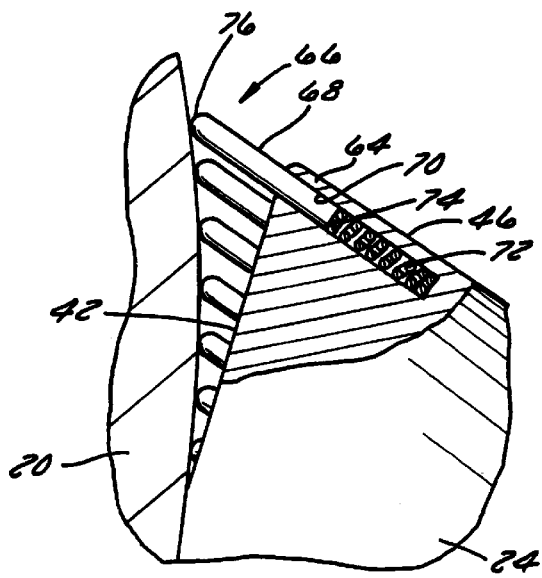
FIG. 10 is an enlarged partial sectional view of the blade and hub shown in FIG. 8.

As illustrated in FIGS. 8–10, the gap generally designated as 66 formed between inner edge 42 and hub outer surface 52 can be substantially reduced or shielded by means of preferably a plurality of pins or fingers 68 matingly received in bores 70 formed in portion 64 of blade 24. Each pin 68 is biased out of bore 70 toward outer surface 52 by means of a spring 72 acting on the end 74 of pin 68 opposite end 76 which is in contact with surface 52. As a result, when blade 24 is rotated about its rotational axis 26, ends 76 of pins 68 remain in contact with outer surface 52, thereby effectively closing gap 66 so that fish cannot be caught therein. Those skilled in the art will readily appreciate that fingers or pins 68 can have various configurations (not necessarily round in cross section), ends 76 can also take different shapes (not necessarily rounded), or a single finger can be used instead of a plurality of fingers, in each case without departing from the scope of this embodiment.

Figure 14:
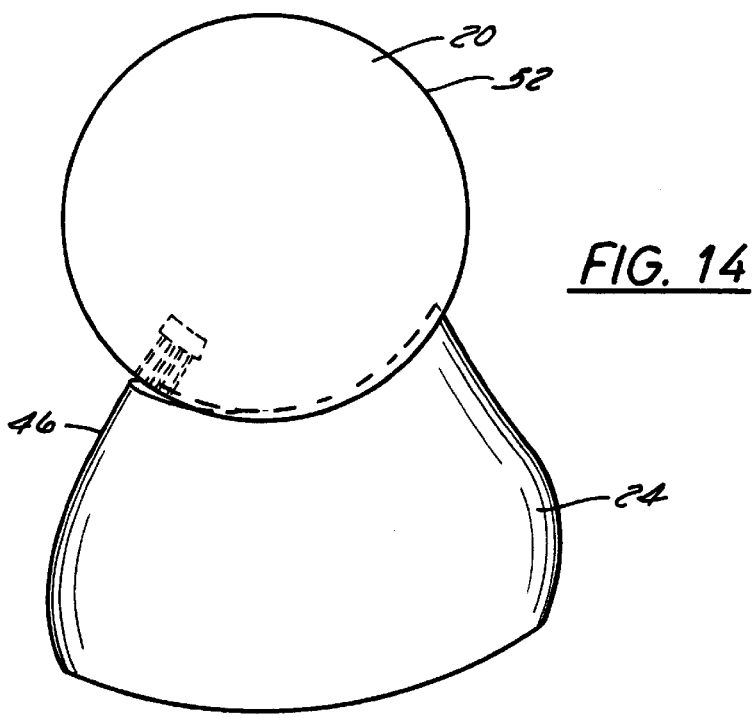
FIG. 14 is a top plan view of the hub and one associated blade in accordance with another embodiment of the present invention, showing a plurality of hub water jets.
Figure 15:
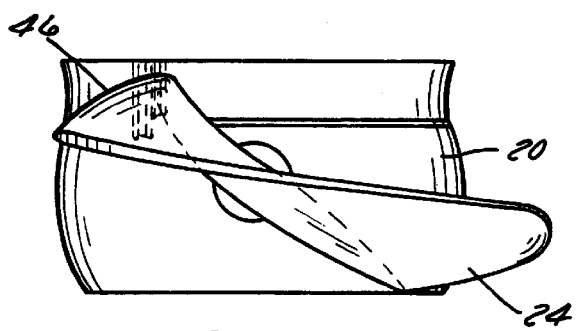
FIG. 15 is a front elevational view of the hub and blade shown in FIG. 14.
Figure 16:
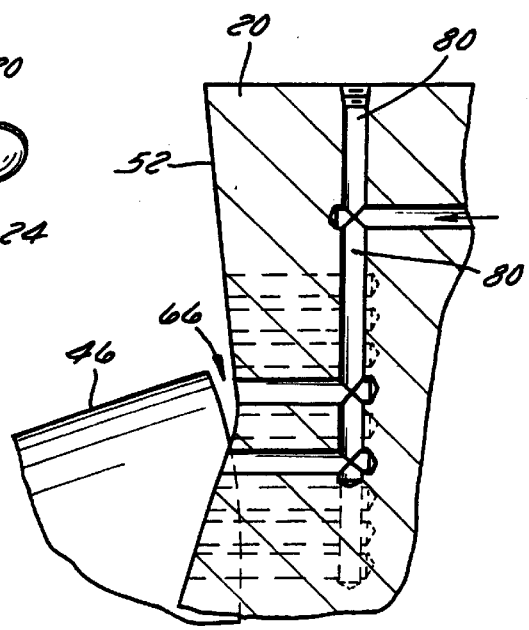
FIG. 16 is an enlarged partial sectional view of the blade and hub shown in FIG. 14.

Turning now to the embodiment disclosed in FIGS. 11–16, there is provided a plurality of water jets 78 dispersing water in gap region 66. Jets 78 comprise water passageways 80 formed in each of blades 24 from leading edge 46 to inner edge 42. Although when blade 24 is positioned toward maximum pitch, a resulting gap 66 is formed between outer surface 52 and inner edge 42, the jets of water 78 which are injected in gap 66 by water passing through passageways 80 effectively prevent fish present in the water from entering gap 66. Alternatively, the water can be injected into gap 66 from hub 20 as illustrated in FIGS. 14–16. In that case, water jets 78 comprise water passageways 80 formed in hub 20 and exiting therefrom at outer surface 52.

A further embodiment of the present invention will now be discussed referring more particularly to FIGS. 17–20. In that case, gap 66 is shielded by a boot generally designated as 82. Boot 82 is preferably made of a deformable material such as rubber connected to leading edge 46 of blade 24. Boot 82 conveniently includes a skirt 84 riding effectively in contact with outer surface 52 of hub 20 during rotation of blade 24 about rotational axis 26. Skirt 84 may also be configured as a plurality of flexible members which remain substantially in contact with outer surface 52. If sufficiently thin, these members may take the form of bristles brushing against outer surface 52 when blade 24 is rotated about axis 26. Conversely, the bristles or flexible members may be attached to hub 20 in regions of outer surface 52 proximate portion 64 when blade 24 is at minimum pitch. Alternatively, as illustrated in FIG. 20, boot 82 may comprise a membrane 86 filled with a pliable fluid 88 thereby allowing boot 82 to remain effectively in contact with outer surface 52 during rotation of blade 24.

As we have seen earlier, pockets 62 represent an effective way to shield gap 66 formed between inner edge 42 and outer surface 52 of hub 20. In certain cases, however, cavity 54 needs to be as large as possible to accommodate the various blade rotation mechanisms. This means that the distance separating outer surface 52 from inner surface 56 (i.e., the thickness of the hub wall) may not be sufficient to permit the formation of pockets deep enough to effectively receive portion 64 and shield gap 66. In certain cases, the wall thickness may even be such as to not permit the formation of any pockets at all. Another embodiment of the present invention addresses situations where the thickness of the hub wall becomes a dominant consideration.

Figure 21:
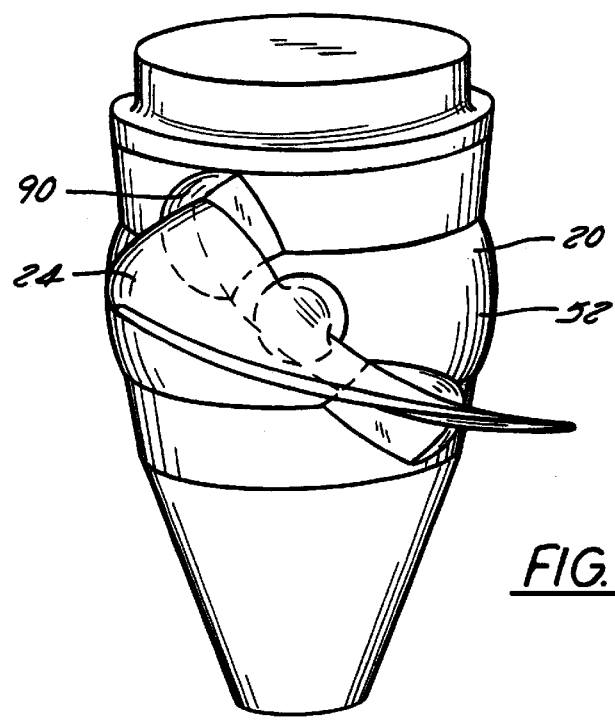
FIG. 21 is a perspective view of the hub and one associated blade in accordance with another embodiment of the present invention, showing raised areas formed on the hub outer surface.
Figure 22:
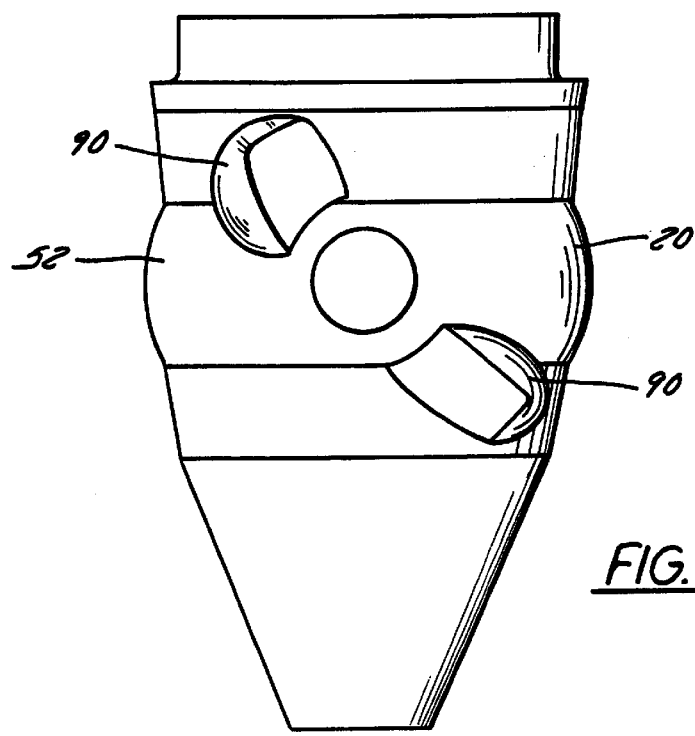
FIG. 22 is a front elevational view of the hub shown in FIG. 21.
Figure 23:
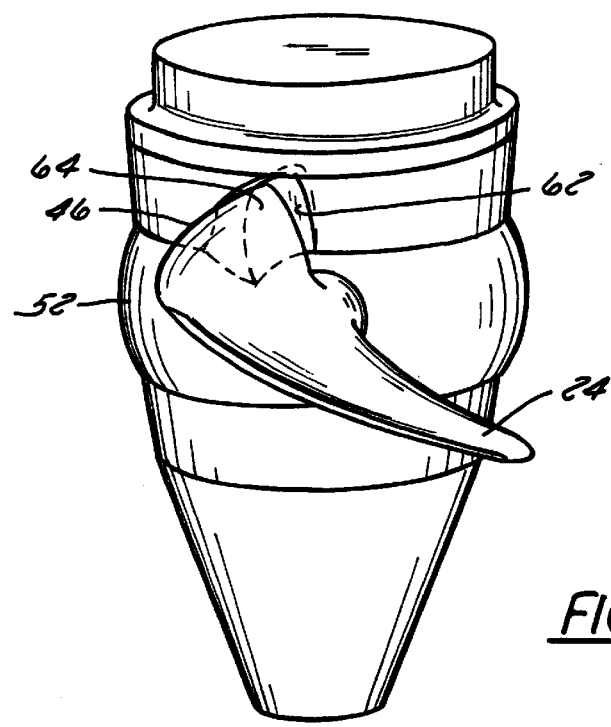
FIG. 23 is a perspective view of the hub and one associated blade as shown in FIG. 21, showing the hub also comprising a pocket formed therein.
Figure 24:
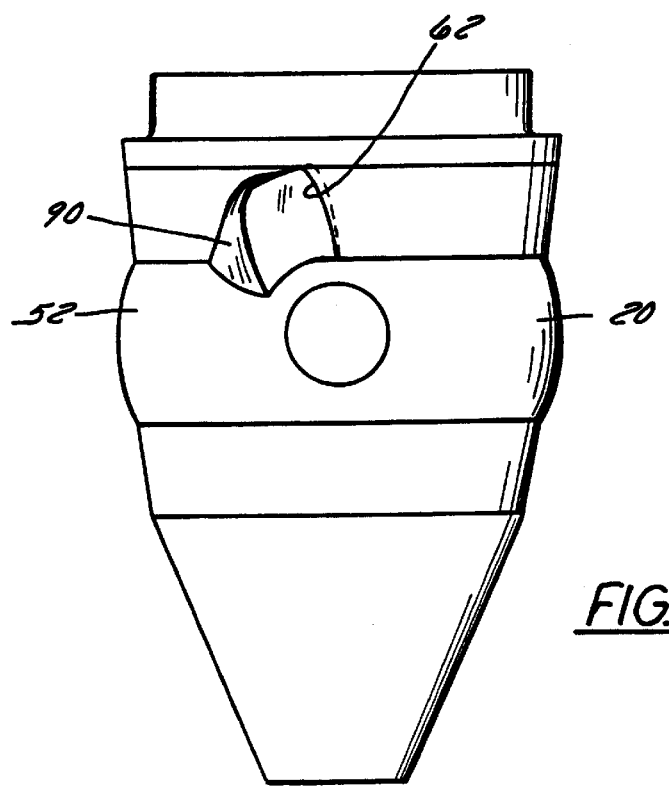
FIG. 24 is a front elevational view of the hub shown in FIG. 23.

Referring more particularly to FIGS. 21–24, hub 20 includes several raised areas 90 locally formed on outer surface 52 in regions of hub 20 upstream of rotational axis 26. Areas 90 are therefore formed proximate leading edge 46 of blade 24 when blade 24 is at minimum pitch, as shown in FIG. 21. As a result, areas 90 shield gap 66 formed between inner edge 42 and outer surface 52. As shown in FIGS. 21 and 22, areas 90 can also be formed downstream of rotational axis 26 in the event the blade and hub construction is such that a gap 66 is also formed in that region of turbine 18. Additionally, in cases where the hub wall thickness is sufficient to form shallow pockets, as shown in FIGS. 23 and 24, several areas 90 may also be combined with a plurality of pockets 62 formed at spaced intervals in outer surface 52. The number of pockets 62 does not necessarily have to correspond to the number of raised areas 90 as various considerations including performance and cost may dictate otherwise. Furthermore, such considerations in light of particular hub and blade configurations may also lead one to select a combination of pockets 62 and areas 90 upstream or downstream only or both downstream and upstream of rotational axis 26. The inventors of the present invention have noted, however, that, to improve the survivability of fish passing through turbine 18 while limiting water turbulence created by these "fish-friendly" features, it is generally preferable to use pockets 62 upstream of rotational axis 26 and raised areas 90 downstream of rotational axis 26.

Figure 25:
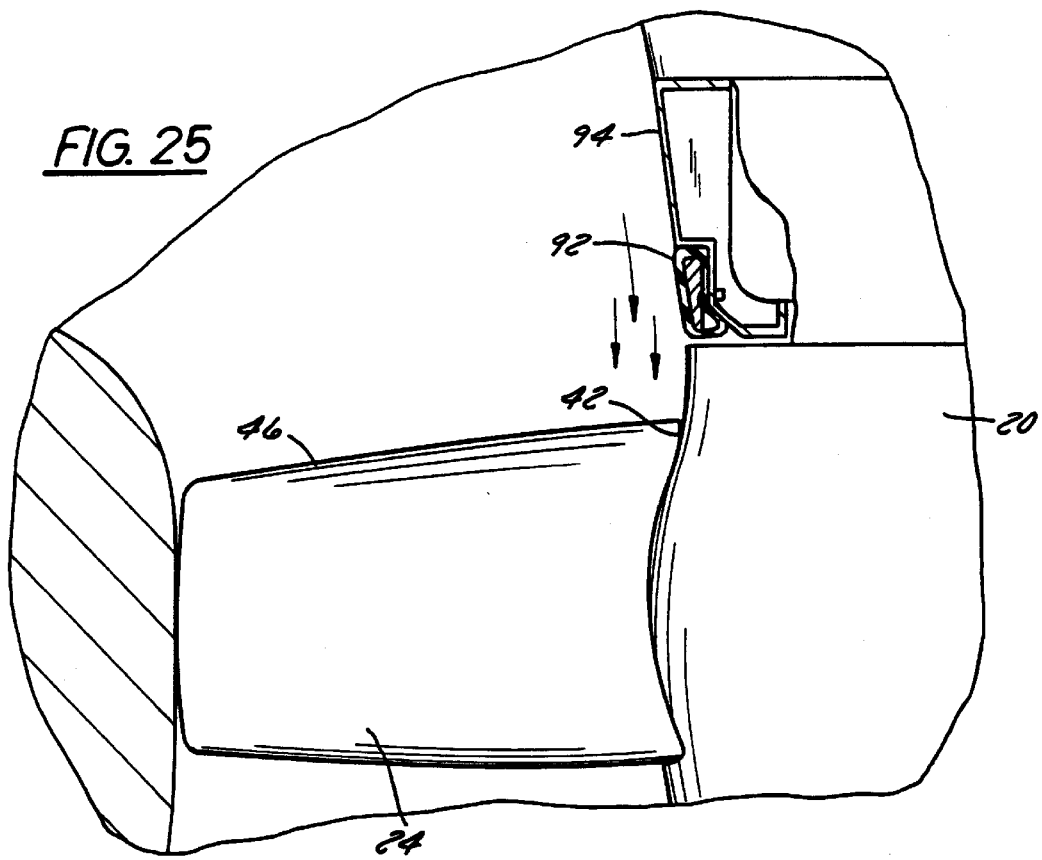
FIG. 25 is a front elevational view of another embodiment of the present invention showing an inflatable shroud in deflated condition.
Figure 26:
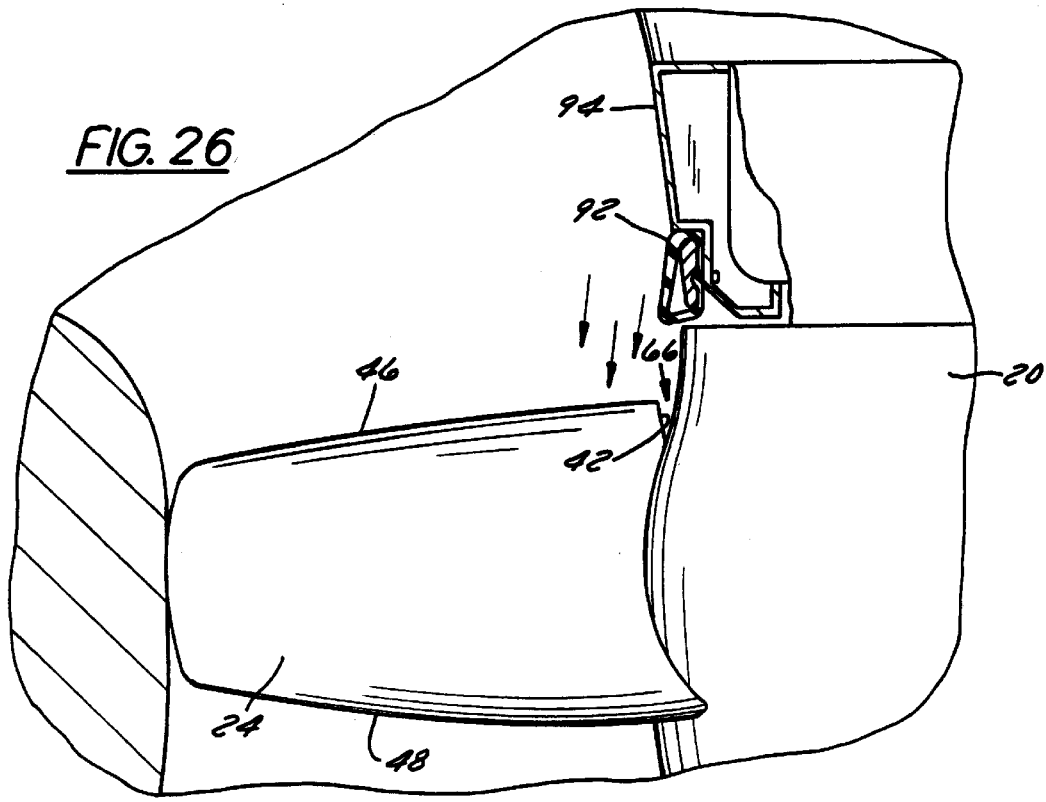
FIG. 26 is a front elevational view of the embodiment of FIG. 25 showing the inflatable shroud in inflated condition.

In certain other cases, it may be more convenient to increase the survivability of fish passing through hydroturbines by associating various features and mechanisms with other turbine elements, or by modifying turbine components other than the hub of the turbine, as illustrated in FIGS. 25–32. Referring to FIGS. 25 and 26, gap 66 is, in effect, shielded by an inflatable shroud 92 connected to a head cover 94 typically disposed upstream of hub 20, i.e. upstream of blade rotational axis 26. Shroud 92 may comprise a single hollow piece of deformable material to form an inflatable region of predetermined length, or may be configured as a continuous inflatable belt surrounding the entire perimeter of head cover 94. In other cases, a plurality of shrouds 92 may be disposed and attached at discrete locations around the perimeter of cover 94. Shroud 92 may also be attached to other components of turbine 18 that are disposed about axis 22 upstream of gap 66. In all cases, however, the rubber-like material of shroud 92 cushions the impact of fish against shroud 92 as they are deflected away from gap 66.

Shroud(s) 92 is (are) inflated as blades 24 are rotated from maximum to minimum pitch. The degree of inflation of shroud 92 may, advantageously, also be controlled to be in direct correlation with the position of blades 24, i.e., going from minimum inflation at maximum pitch (as shown in FIG. 25), to maximum inflation at minimum pitch (as shown in FIG. 26).

Figure 27:
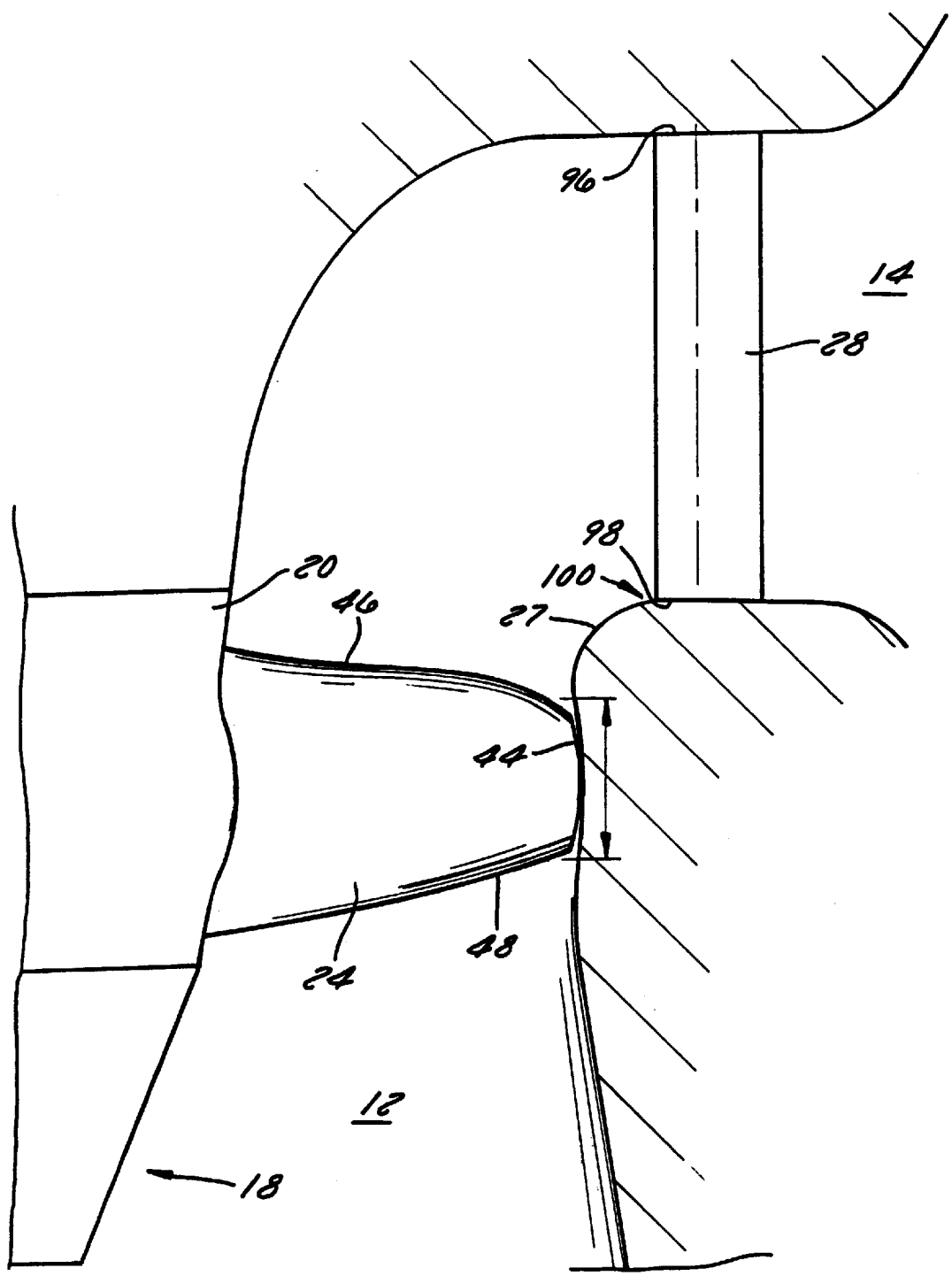
FIG. 27 is a partial front elevational view of the hub and blades in accordance with the present invention showing a spherical discharge ring.

Referring to FIG. 27, turbine 18 is shown positioned in water passageway 12 extending from upstream end 14 of installation 10 to a lower elevation discharge region 16. Passageway 12 includes discharge ring 27 disposed upstream of blades 24. Discharge ring 27 has a spherical configuration to cooperate with outer edge 44 of blades 24 as blades 24 are rotated about rotational axes 26. The spherical configuration of discharge ring 27 shields outer edge 44 of each of blades 24 from the path of fish flowing through turbine 18, thereby increasing their survivability. Still with reference to FIG. 27, passageway 12 further includes a plurality of wicket gates 28. Wicket gates 28 are typically rotatable to control water flowing from upstream end 14. Each wicket gate 28 includes an upper edge 96 and a distal lower edge 98. As illustrated in FIG. 27, the spherical configuration of discharge ring 27 also advantageously cooperates with lower edge 98 to reduce a discharge gap 100 formed between discharge ring 27 and lower edge 98. As a result, spherical discharge ring 27 reduces the size of gaps commonly formed between ring 27, blade outer edge 44 and wicket gate lower edge 98, thereby diminishing the likelihood of fish being caught and injured or killed by these gaps.

Turning now to FIG. 28, there is illustrated a turbine 18 having a hub 20 and associated blades 24 which are rotatable about rotational axis 26. As discussed above, to reduce injury to fish passing through turbine 18, hub 20 is provided with a shroud 58 having a plurality of pockets 62 formed at spaced intervals around the circumference of shroud 58. To reduce injury to fish downstream of rotational axis 26, the downstream region 102 of hub 20 is configured as a sphere. As a result, when blades 24 are rotated about axes 26, no gap is formed between inner edge 42 and region 102 since inner edge 42 closely conforms to outer surface 52 of hub 20.

Referring now to FIGS. 29–34, the present inventors have noted that it should be possible to also improve the overall survivability of fish passing through turbine 18—whether or not turbine 18 is already provided with features as described above designed to shield gaps formed between inner edge 42 and outer surface 52, and/or reduce gaps formed with the blade outer edge or the wicket gate—by modifying the configuration commonly used for blades 24. Specifically, at least the region of inner edge 42 proximate leading edge 46 (i.e., the blade edge at portion 64) is advantageously rounded to reduce injury to the fish that may be stricken by blade 24 (see FIG. 30) during rotation of hub 20. Furthermore, inner edge 42 may also be rounded in a region 104 of inner edge 42 extending downstream of axis 26 to trailing edge 48. In that case, however, and as illustrated in FIG. 31, inner edge 42 of region 104 need not be rounded to the same degree as inner edge 42 of portion 64 because fish are typically carried by water flowing on water directing surface 50 from leading edge 46 to trailing edge 48. The chance of fish being stricken by inner edge 42 in region 104 is therefore much lesser than by inner edge 42 extending about portion 64. Additionally, as illustrated in FIG. 33, a portion of outer edge 44 proximate leading edge 46 may also be rounded to reduce fish injury by rotation of blade 24 with hub 20. However, outer edge 44 need not be rounded to the same degree along its entire length as shown in FIG. 34. This is because fish will typically be injured by the portion of outer edge 44 extending from leading edge 46.

The foregoing features, designed to increase the survivability of fish as they pass through hydroelectric turbines having adjustable blades and wicket gates, are advantageously associated with control systems providing traditional governor functions and control routines to ensure adequate operation of installation 10. As discussed earlier, the use of adjustable blade turbines permits high efficiency output under a wide range of operating conditions, and in particular under various "net head" conditions, i.e., under conditions where the difference between the upper elevation source and lower elevation discharge region water levels varies widely. Such broad range of operating conditions typically requires automatic and simultaneous adjustment of blades 24 and wicket gates 28 in accordance with load demand.

Adjusting the position of the blades and wicket gates necessitates sensing various parameters including turbine speed, wicket gate position, blade pitch, net head, and output power, as the most characteristic ones. In the early years of Kaplan turbines, sensing of most of these parameters was done mechanically. For example, the speed of the turbine was generally represented by the position of a flyball responsive to the centrifugal force imparted to it by rotation of the turbine. As shown at pages 9–14 of the Woodward Governor Company specification no. 07018D covering its mechanical hydraulic governor, the flyball position is then compared to the position of the blade by way of a cam and associated linkage mechanism, and hydraulic systems to provide the necessary input to the governor. Additionally, these mechanical control systems were open-loop systems, i.e., they required operator interface. For example, the operator seasonally had to change the cam used with associated linkage mechanisms to provide the representative net head input information.

Figure 35:
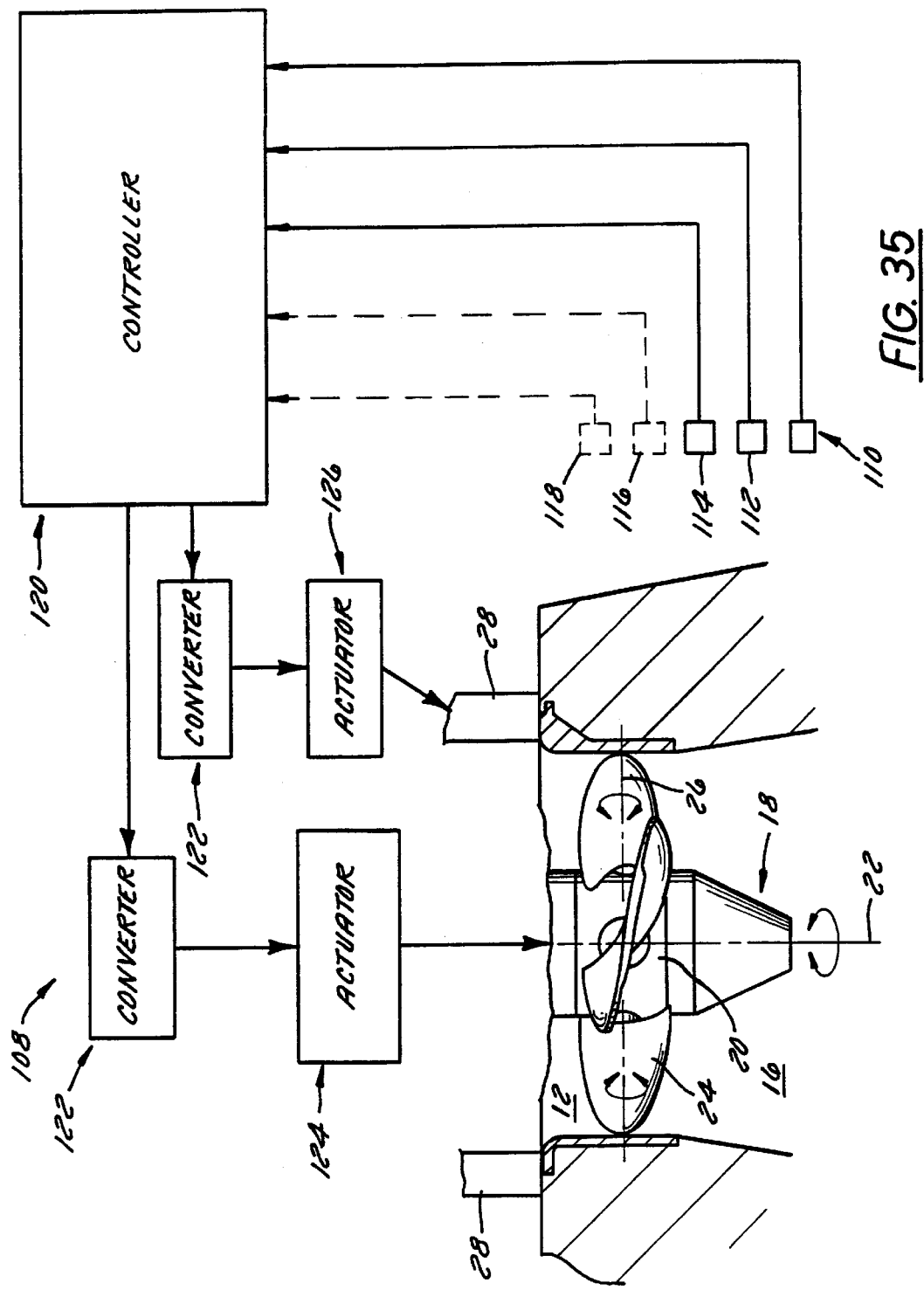
FIG. 35 shows a block diagram of the closed-loop control systems associated with a turbine of the present invention.

Referring now more particularly to FIG. 35, a control system generally designated as 108 may advantageously be used with the various embodiments of the present invention. Control system 108 includes a plurality of sensors 110–118 designed to measure turbine operation and other related control parameters. The electric signals generated by sensors 110–118 are sent to a controller 120, preferably via signal conditioning circuits (not shown). For example, the electrical signal representative of the speed of turbine 18 is provided by a toothed disc mounted on the shaft of turbine 18; the disc is associated with two inductive sensing elements providing two independent signals to controller 120. Controller 120 also receives an electrical signal generated by sensor 112 and representative of the position of wicket gate 28. Controller 120 preferably includes a digital-based processor and required analog to digital conversion and signal scaling circuits.

The information provided by the various sensors is used in control algorithms allowing controller 120 to compute and generate various control signals, as required, for the efficient operation of installation 10, without significantly compromising the gains in the survivability of fish achieved by the embodiment(s) of the present invention that is (are) associated with control system 108. The control signals generated by controller 120 are then fed to a plurality of signal converters generally designated as 122. The signal from each signal converter 122 is sent in the appropriate form to an associated actuator which is preferably of the hydraulic-type.

As shown in FIG. 35, actuator 124 is used to adjust the position of blades 24, while actuator 126 is used to adjust the opening of wicket gates 28, in each case as determined by controller 120, i.e., for efficient operation of turbine installation 10. However, in the attempt to further improve fish survivability as they pass through turbine 18, it may be desirable to have one signal convertor 122/actuator 126 associated with each individual wicket gate 28, or alternatively with a defined group of wicket gates 28. These additional adjustment capabilities allow controller 120 to individually control the position of each wicket gate 28 separately, or alternatively, to control a group of wicket gates 28 together, using as additional parameter in the control algorithms the density of fish present in the water flowing through turbine 18. This additional information allows controller 120 to establish the position of blades 24 and the absolute or relative position of each wicket gate 28, to improve the survivability of fish passing through turbine 18, without impairing its efficiency. In other words, control system 108 provides another way, whether used alone or in combination with some of the other embodiments of the present invention, to attempt to increase the survivability of fish passing through a turbine having adjustable blades and wicket gates.

It should be understood that the above description is of preferred exemplary embodiments of the present invention, and that the invention is not limited to the specific forms described. For example, the features described in the foregoing may be similarly applied to the gap formed between outer surface 52 of hub 20 and the portion of inner edge 42 extending downstream of blade rotational axis 26. In addition, those skilled in the art will appreciate that other means may be developed to deflect fish away from gap 66, or conversely, to shield gap 66 from fish flowing through turbine 18, or to reduce the size of gap 66. Furthermore, controllers of the type associated with the described means do not necessarily need to be of the digital processor-based type. Such other constructions are, nevertheless, considered to be within the scope of this invention. Accordingly, these and any other substitutions, modifications, changes and omissions may be made in the design and arrangement of the elements and in their method of operation as disclosed herein without departing from the scope of the appended claims.

What is claimed is:

1. A turbine installation adaptable to improve the survivability of fish present in water flowing therethrough, comprising:

a turbine disposed in the flow of water for producing electrical energy, the turbine including,
a hollow hub having spaced apart inner and outer surfaces and longitudinal axis,
a plurality of runner blades, each blade comprising a hydrofoil having an inner edge and a distal outer edge, a leading edge and a trailing edge separated by a water directing surface, each blade being pivotally connected to the hub about a rotational axis extending in a direction generally perpendicular to the longitudinal axis so that its inner edge is proximate the hub, each blade being rotatable from a maximum pitch position, in which the water directing surface is substantially parallel to the longitudinal axis, to a minimum pitch position in which the water directing surface is substantially perpendicular to the longitudinal axis, and
at least one spring biased member extending into a gap formed between the inner edge of at least one of the blades and the outer surface of the hub as the blade is rotated between the minimum and maximum pitch positions, the at least one spring biased member being situated in a recess formed in an inner edge of the blade and having a surface configured for sliding contact with the outer surface of the hub; and
an electrical closed-loop control system including an electrical controller and a plurality of sensors, the sensors selectively generating electrical signals indicative of turbine speed, blade pitch and net head, the electrical controller receiving and processing the electrical signals from the sensors and capable of adjusting the blades in position in response thereto.

2. The turbine installation of claim 1, wherein the at least one spring biased member is a plurality of spring biased members, each of which is mounted in a separate recess and individually biased into sliding contact with the outer surface of the hub as the blade is rotated between the minimum and maximum pitch positions.

3. The turbine installation of claim 1, wherein the at least one spring biased member is biased into sliding contact with the outer surface of the hub by a compression spring.

4. The turbine installation of claim 1, wherein the at least one spring biased member is a pin having a circular cross-section.

5. The turbine installation of claim 1, wherein the sensors further selectively generate signals indicative of fish present in the water.

6. The turbine installation of claim 1, wherein the electrical processor is a digital-based processor.

7. The turbine installation of claim 1, further including a plurality of wicket gates adjustable in position to control the water flowing through the turbine, the electrical controller generating signals for adjusting the wickets gates in position.

8. A turbine installation adaptable to improve the survivability of fish present in water flowing therethrough, comprising:
   a turbine disposed in the flow of water for producing electrical energy, the turbine including,
      a hollow hub having spaced apart inner and outer surfaces and a longitudinal axis,
      a plurality of runner blades, each blade comprising a hydrofoil having an inner edge and a distal outer edge, a leading edge and a trailing edge separated by a water directing surface, each blade being pivotally connected to the hub about a rotational axis extending in a direction generally perpendicular to the longitudinal axis so that its inner edge is proximate the hub, each blade being rotatable from a maximum pitch position, in which the water directing surface is substantially parallel to the longitudinal axis, to a minimum pitch position in which the water directing surface is substantially perpendicular to the longitudinal axis, and
      at least one movable member extending into a gap formed between the outer surface of the hub and the inner edge of at least one of the blades, the at least one movable member being mounted to the blade and biased into contact with the outer surface of the hub as the blade is rotated between the minimum and maximum pitch positions; and
   an electrical closed-loop control system including an electrical controller and a plurality of sensors, the sensors selectively generating electrical signals indicative of turbine speed, blade pitch and net head, the electrical controller receiving and processing the electrical signals from the sensors and capable of adjusting the blades in position in response thereto.

9. The turbine installation of claim 8, wherein the at least one movable member is a plurality of spring biased members, each of which is mounted in a separate recess and independently biased into sliding contact with the outer surface of the hub as the blade is rotated between the minimum and maximum pitch positions.

10. The turbine installation of claim 8, wherein the at least one movable member is biased into sliding contact with the outer surface of the hub by a compression spring.

11. The turbine installation of claim 8, wherein the at least one movable member is a plurality of pins having circular cross-sections, each pin being situated in a circular bore formed in the inner edge of the blade.

12. The turbine installation of claim 8, wherein the sensors further selectively generate signals indicative of fish present in the water.

13. The turbine installation of claim 8, wherein the electrical processor is a digital-based processor.

14. The turbine installation of claim 8, further including a plurality of wicket gates adjustable in position to control the water flowing through the turbine, the electrical controller generating signals for adjusting the wickets gates in position.

15. A turbine installation adaptable to improve the survivability of fish present in water flowing therethrough, comprising:
   a turbine disposed in the flow of water for producing electrical energy, the turbine including,
      a hollow hub having spaced apart inner and outer surfaces and a longitudinal axis;
      a plurality of runner blades, each blade comprising a hydrofoil having an inner edge and a distal outer edge, a leading edge and a trailing edge separated by a water directing surface, each blade being pivotally connected to the hub about a rotational axis extending in a direction generally perpendicular to the longitudinal axis so that its inner edge is proximate the hub, each blade being rotatable from a maximum pitch position, in which the water directing surface is substantially parallel to the longitudinal axis, to a minimum pitch position in which the water directing surface is substantially perpendicular to the longitudinal axis; and
      a plurality of fingers extending into a gap formed between the outer surface of the hub and the inner edge of at least one of the blades, each of the fingers being mounted to the blade and independently biased into contact with the outer surface of the hub as the blade is rotated between the minimum and maximum pitch positions; and
   an electrical closed-loop control system including an electrical controller and a plurality of sensors, the sensors selectively generating electrical signals indicative of turbine speed, blade pitch and net head, the electrical controller receiving and processing the electrical signals from the sensors and capable of adjusting the blades in position in response thereto.

16. The turbine installation of claim 15, wherein each of the fingers is mounted in a bore formed along the inner edge of the blade and biased into contact with the outer surface of the hub by a spring.

17. The turbine installation of claim 15, wherein each of the fingers is a pin having a circular cross-section and mounted in a circular bore formed in the inner edge of the blade.

18. The turbine installation of claim 15, wherein the sensors further selectively generate signals indicative of fish present in the water.

19. The turbine installation of claim 15, wherein the electrical processor is a digital-based processor.

20. The turbine installation of claim 15, further including a plurality of wicket gates adjustable in position to control the water flowing through the turbine, the electrical controller generating signals for adjusting the wickets gates in position.

* * * * *